(12) United States Patent
Gaonkar et al.

(10) Patent No.: US 7,972,646 B2
(45) Date of Patent: Jul. 5, 2011

(54) AROMA-PRODUCING COMPOSITIONS FOR FOODS

(75) Inventors: Anilkumar Ganapati Gaonkar, Buffalo Grove, IL (US); Cathy Jean Ludwig, Grayslake, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 162 days.

(21) Appl. No.: 12/212,075

(22) Filed: Sep. 17, 2008

(65) Prior Publication Data

US 2009/0011093 A1    Jan. 8, 2009

Related U.S. Application Data

(63) Continuation of application No. 10/876,813, filed on Jun. 25, 2004, now Pat. No. 7,442,399.

(51) Int. Cl.
*A23L 1/222* (2006.01)
(52) U.S. Cl. .............. 426/651; 426/89; 426/94; 426/99; 426/534; 426/601; 426/650
(58) Field of Classification Search .................... 426/89, 426/94, 99, 534, 601, 650, 651
See application file for complete search history.

(56) References Cited

U.S. PATENT DOCUMENTS

| | | |
|---|---|---|
| 4,857,340 A | 8/1989 | Parliment et al. |
| 5,064,669 A | 11/1991 | Tan et al. |
| 5,556,652 A | 9/1996 | Cherukuri et al. |
| 5,582,855 A | 12/1996 | Cherukuri et al. |
| 6,153,236 A | 11/2000 | Wu et al. |
| 6,190,722 B1 | 2/2001 | Kim et al. |
| 6,312,751 B1 | 11/2001 | Cain et al. |
| 6,312,752 B1 | 11/2001 | Lansbergen et al. |

FOREIGN PATENT DOCUMENTS

EP    1413202    4/2004

OTHER PUBLICATIONS

European Search Report, European Search Authority, EP Application No. 05253487.2-2114, Aug. 30, 2005, 3 pages.

*Primary Examiner* — Leslie Wong
(74) *Attorney, Agent, or Firm* — Fitch, Even, Tabin & Flannery (57) ABSTRACT

An improved aroma-producing composition is provided that is shelf-stable and allows controlled release of a desired aroma from the composition, and also food products treated with the aroma-producing composition. The aroma-producing composition is a homogenous one-phase system which includes an aroma-producing material and a fat-containing composition which includes a medium chain fatty acid triglyceride and fat or lipid having a melting point greater than the medium chain fatty acid triglyceride. The aroma-producing composition can be heated to induce and boost aroma release from the aroma-producing composition at an opportune time, such as when a food product treated with the aroma-producing composition is preheated by microwave heating immediately before it is consumed.

26 Claims, 1 Drawing Sheet

Figure 1

AROMA-PRODUCING COMPOSITIONS FOR FOODS

CROSS-REFERENCE TO RELATED APPLICATIONS

This application is a Continuation of U.S. patent application Ser. No. 10/876,813, filed Jun. 25, 2004, now U.S. Pat. No. 7,442,399 of which is hereby incorporated herein by reference in its entirety.

FIELD OF THE INVENTION

The present invention generally relates to aroma-producing compositions that are shelf-stable and provide heat-controlled release of aroma from the compositions. It also relates to food products treated with the aroma-producing compositions.

BACKGROUND OF THE INVENTION

Microwavable baked goods have been commercially sold in which consumers may warm prebaked food products, such as soft cookies, in an microwave oven to make them more savory. Ideally, a robust aroma should be released from the microwaved food product that mimics the aroma of a freshly baked good or otherwise provides a pleasant aroma to a consumer of the product.

The presence and increased concentration of a flavor additive in a food product may help improve aroma-production. However, food production costs generally increase with increased use of additives. Moreover, the introduction of high levels of artificial flavor additives may impart an undesirable chemical taste. Techniques for imparting increased and controllable aroma impact at reduced flavor additive levels are desirable in the food technologies. Many food flavoring materials tend to be sensitive to exposure to air, moisture, light, and so forth. Unprotected flavoring materials applied on exposed outer surfaces of food products will tend to be more easily degraded during storage of the food product. As a result, the release of aromas from unprotected flavoring materials tends to be diminished when the food product is reheated after storage.

One generally known technique for protecting perishable or degradable edible materials is microencapsulation. For instance, U.S. Pat. No. 6,153,236 describes encapsulation of food ingredients and other substrates using microcapsules made of a high laurate vegetable oil, which permit slow release of a food acid into a foodstuff. U.S. Pat. No. 4,857,340 describes an aroma-producing composition combined with a microwave-comestible and/or microwavable package so that aroma is released when the comestible is prepared in a microwave oven. U.S. Pat. No. 4,857,340 describes a lipid that enrobes an aroma-producing material and inhibits release of aroma at ambient or storage temperatures. When irradiated with microwave energy, the lipid is intended to melt, thereby causing the aroma-producing material to release its aroma. One challenge associated with microencapsulation is the difficulty in sticking flavor microcapsules to the food surface or otherwise incorporating them in the food without rupturing them.

As another disclosed food flavoring technique, U.S. Pat. No. 6,312,751 describes edible fat-based flakes containing a flavoring system comprising 20 to 90 percent fat with a Stevens hardness at 25° C. of more than 65 g and optionally moisture, a flavoring system, sugar, filler, and a health component. The fat is selected from natural or hydrogenated glycerides based on fatty acids of twelve or more carbon atoms. U.S. Pat. No. 6,312,752 describes edible fat-based flakes having a size of 0.05 to 2.5 cm, in which the flakes have a composition that contains a baker compatible fat that displays a Crystal-5 value of at least 40 percent and a Crystal-5 to N20 ratio of at least 0.55, and optionally moisture, a flavoring system, sugar, and filler. According to this patent, the Crystal-5 value is the amount of crystallized fat, obtained after cooling a fat to 20° C. for 5 minutes and the N20 value is the solid fat content for the fat as measured by known NMR pulse measurement on a non-stabilized fat. The discrete flavoring flakes are described as an ingredient for the preparation of bakery and snack products in which they are understood to be intimately admixed into the bulk of food products, and they were not described as available on food surfaces in quantities that might support robust aroma release.

There remains a need for food technologies that can offer increased and controllable aroma impact to the consumer at reduced additive levels. The present invention may be used to fulfill these, as well as other needs and objectives, as will be apparent from the following description of embodiments of the present invention.

SUMMARY OF THE INVENTION

The present invention provides improved aroma-producing compositions that are shelf-stable and provide rapid heat-controlled release of aroma from the composition. The present invention also provides food products treated with the aroma-producing composition.

In accordance with an embodiment, an aroma-producing composition includes, as a homogenous one-phase system, (1) an aroma-producing material and (2) a fat-containing composition comprising (a) a medium chain fatty acid triglyceride that solubilizes the aroma-producing material and (b) a fat or a lipid containing long chain saturated fatty acids, wherein the fat or lipid has a melting point of at least about 20° C. greater than the fatty acid triglyceride and wherein the fat or lipid provides structure to allow the formation of the homogenous one-phase system. The combination of the fatty acid triglyceride, which effectively solubilizes the aroma-producing materials and allows the formation of a stable homogenous one-phase system with the fat or lipid providing the structure. The aroma-producing material may be water soluble or partially water soluble; preferably the aroma-producing material is water soluble. The medium chain fatty acid glyceride contains fatty acid chains containing 6 to 12 carbon atoms, and more preferably 8 to 10 carbon atoms. The fat or lipid contains at least one long chain saturated fatty acid with 14 to 24 carbon atoms, and more preferably 16 to 20 carbon atoms. The fat or lipid has a melting point at least about 20° C. greater than the fatty acid triglyceride, preferably about 30 to about 60° C. greater than the fatty acid triglyceride, and more preferably about 40 to about 50° C. greater than the fatty acid triglyceride. Preferred fats and lipids include hydrogenated and partially hydrogenated oils (e.g., soybean oil, rapeseed oil, cottonseed oil, canola oil, sunflower oil, coconut oil, palm oil, and the like as well as mixtures thereof), and the like; preferred lipids include long chain (i.e., containing 14 to 24 carbon atoms) trans fatty acids, saturated fatty acids, including mono-, di-, and tri-acyl glycerols (e.g., glycerol monostearate, glycerol distearate, glycerol tristearate, and the like as well as mixtures thereof), and the like.

The resulting homogenous one-phase system is sprayable under moderate heat conditions (i.e., about 40 to about 80° C. and preferably about 55 to about 65° C.) and otherwise well-suited for convenient modes of application to surfaces of food products. Once applied onto a food surface, the aroma-producing coating composition congeals into an immobilized single phase material and adheres on the food surface as it cools. In one aspect, the aroma-producing composition is essentially non-flowable at temperatures of below about 35° C., and flowable at higher temperatures; thus, it can be easily manipulated and handled for coating operations and stable storage.

The medium chain fatty acid glyceride component of the fat-containing composition may also act as a microwave-susceptible and heat-labile material within the aroma-producing composition such that rapid microwave heat treatment may be used to induce robust aroma release from the aroma-producing composition at the desired time (i.e., immediately before consumption or simply when the aroma is desired) under moderate heating conditions (generally as generated in microwave heating). The presence of the higher melting point fat or lipid increases the solids content of the one-phase system during storage at ambient conditions and helps stabilize and protect the aroma-producing material within the one-phase system.

In one embodiment, the aroma-producing composition includes, as a homogenous one-phase system, (1) about 5 to about 40 percent aroma-producing material and (2) about 60 to about 95 percent fat-containing composition comprising (a) about 35 to about 75 percent medium chain fatty acid triglyceride that solubilizes aroma-producing material and (b) about 25 to about 65 percent fat or lipid having a higher melting point than the fatty acid triglyceride. Preferably, the aroma-producing composition includes, as a homogenous one-phase system, (1) about 10 to about 35 percent aroma-producing material and (2) about 65 to about 90 percent fat-containing composition comprising (a) about 45 to about 70 percent fatty acid triglyceride that solubilizes aroma-producing material and (b) about 30 to about 55 percent fat or lipid having a higher melting point than the fatty acid triglyceride. The aroma-producing material may comprise a minor amount (generally less than 50 percent and preferably less than about 40 percent) of an aroma-producing flavor or ingredient and a major amount (general greater than 50 percent and preferably greater than 60 percent) of a solvent in which the aroma-producing flavor or ingredient is soluble.

The aroma-producing composition includes a medium chain fatty acid triglyceride for solubilizing the aroma-producing material. Preferably, the medium chain fatty acid triglyceride has three saturated fatty acid groups, each independently having about 6 to about 12 carbon atoms, and preferably about 8 to about 10 carbon atoms, connected to the glycerol backbone. In a more preferred embodiment, the medium chain fatty acid triglyceride comprises glycerol tridecanoate (also termed "glycerol tricaprate") which is particularly effective for solubilizing water soluble aroma-producing materials. Preferably, the aroma-producing composition can also act as a microwave energy susceptor to promote rapid microwave heating, thereby providing a more robust liberation of aroma. The higher melting point fat or lipid component of the fat-containing composition preferably is a hydrogenated oil, or mixture of such oils, having at least one fatty acid chain having about 14 to about 24 carbon atoms. For purposes of this invention, "hydrogenated vegetable oil" is intended to include fully hydrogenated vegetable oils and partially hydrogenated vegetable oils which have about 30 percent or more hydrogenation. Examples of suitable higher melting vegetable oils include, but not limited to, soybean oil, rapeseed oil, cottonseed oil, canola oil, sunflower oil, coconut oil, palm oil, and the like, as well as mixtures thereof. Examples of non-vegetable oils, include but not limited to, waxes (such as carnuba wax, bees wax, and paraffin wax) and animal fats. The higher melting point lipid component of the fat-containing composition preferably is a saturated lipid, or mixture of such lipids, having about 14 to about 24 carbon atoms. Examples of suitable higher melting lipids include trans fatty acids (having about 14 to about 24 carbon atoms) and mono-, di-, and triacyl glycerols, and the like, as well as mixtures thereof. Generally, the higher melting point hydrogenated fat or lipid should have a melting point at least about 20° C. higher than the fatty acid triglyceride, preferably about 30 to about 60° C. higher, and more preferably about 40 to about 50° C. higher.

In a preferred embodiment, a food product having the aroma-producing composition provided on its surface is storage stable and capable of releasing aroma from the aroma-producing constituent when the food product is rapidly heated. In a particular embodiment, microwave energy is used to induce heating of the aroma-producing composition sufficient to boost aroma release. For instance, in one embodiment, a pleasant and robust food aroma may be obtained from a baked good (e.g., cookie, bread, muffin, and the like) which has been previously coated with the aroma-producing composition, upon subjecting the baked good to microwave energy for a brief period of time, such as between about 5 to about 30 seconds in one non-limiting aspect. In this manner, a consumer can conveniently and effectively boost the aroma of a food product treated with an aroma-producing composition in accordance with this invention immediately before it is consumed, and thereby significantly enhance the eating experience.

DETAILED DESCRIPTION OF THE PREFERRED EMBODIMENTS

The present invention relates to an aroma-producing composition which is provided as a homogenous one-phase system comprising (1) an aroma-producing material and (2) a fat-containing composition which solubilizes the aroma-producing material, protects the aroma-producing material during storage, and provides a composition which can be thermally induced to release a boosted level of aroma. The fat-containing composition comprises (a) a medium chain fatty acid triglyceride that solubilizes the aroma-producing material and (b) a fat (preferably a hydrogenated vegetable fat) or a lipid (preferably a saturated lipid) containing long chain saturated fatty acids, wherein the fat or the lipid has a higher melting point (at least about 20° C. higher) than the medium chain fatty acid triglyceride. Food products having the aroma-producing composition applied thereon or therein release robust levels of pleasant and desirable aromas upon being heated by consumers before the foods are eaten. The consumer's eating experience is more stimulating and enhanced in this manner. The aroma-producing compositions of the present invention are prepared as stable, homogenous one-phase systems that may be conveniently applied to food surfaces, where they are readily available to release aroma on demand.

Figure 1:
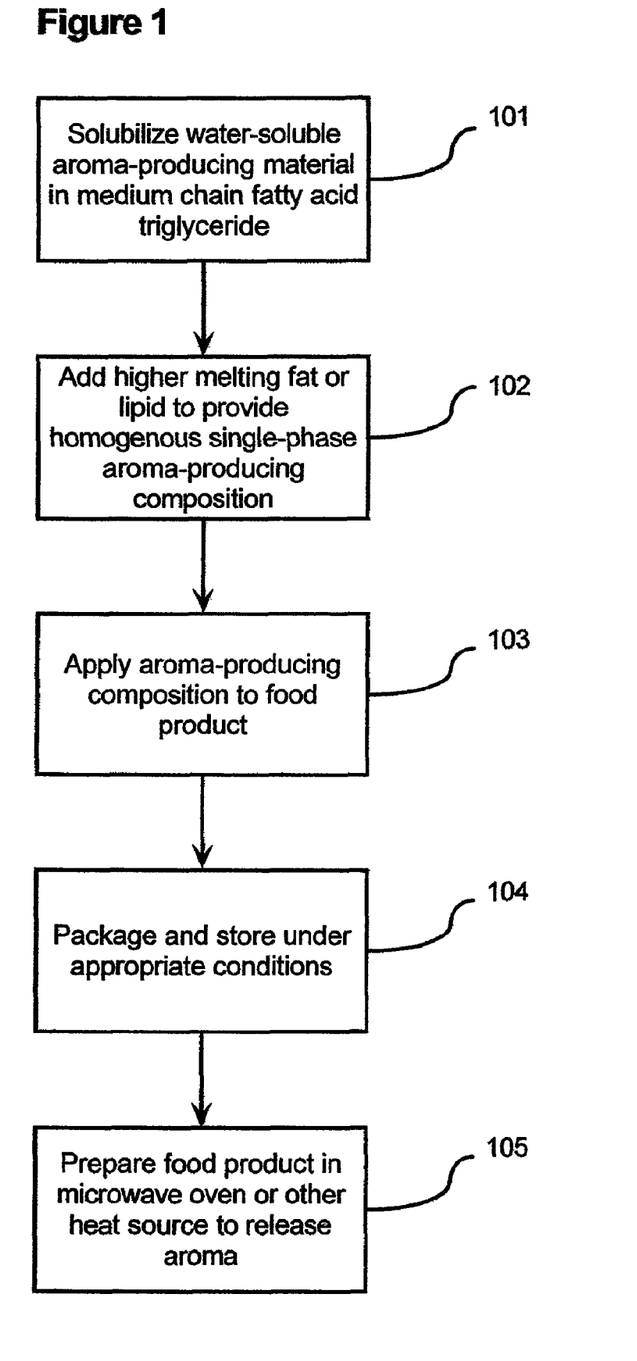
FIG. 1 shows a flow chart for making and using a food product treated with an aroma-producing composition in accordance with one embodiment of this invention, wherein the food product is heated in a microwave oven.

Referring to FIG. 1, one embodiment is shown for making and using the aroma-producing composition in accordance with a non-limiting embodiment of this invention. In step

101, a medium chain fatty acid triglyceride is used to solubilize an aroma-producing material (preferably a water-soluble aroma-producing material). In step 102, a fat (preferably a hydrogenated vegetable fat) or a lipid (preferably a saturated lipid) having a higher melting point than the medium chain fatty acid triglyceride is added with mixing to form an aroma-producing composition as a stable homogenous one-phase system. In step 103, the aroma-producing composition is applied to a food product (preferably onto the surface of the food product). In step 104, and assuming proper packaging, the treated food product may be stored for period of time until a consumer decides to prepare the product. In step 105, the food product is microwaved for a brief period of time (e.g., about 5 to 30 seconds or some other time period appropriate for the particular food product if the food product itself is to be heated) sufficient for the aroma-producing composition to be induced to release increased aroma than otherwise will occur if the treated food product is left at ambient temperature when served.

In one embodiment, the aroma-producing composition includes, as a homogenous one-phase system, (1) about 5 to about 40 percent aroma-producing material and (2) about 60 to about 95 percent fat-containing composition comprising (a) about 35 to about 75 percent medium chain fatty acid triglyceride that solubilizes aroma-producing material and (b) about 25 to about 65 percent fat or lipid having a higher melting point than the medium chain fatty acid triglyceride. Preferably, the aroma-producing composition includes, as a homogenous one-phase system, (1) about 10 to about 35 percent aroma-producing material and (2) about 65 to about 90 percent fat-containing composition comprising (a) about 45 to about 70 percent medium chain fatty acid triglyceride that solubilizes aroma-producing material and (b) about 30 to about 55 percent fat or lipid having a higher melting point than the medium chain fatty acid triglyceride.

Regarding the fat-containing composition, the medium chain fatty acid triglyceride effectively solubilizes water-soluble aroma-producing materials and also is compatible with the higher melting fat or lipid. The higher melting fat or lipid helps to stabilize the system, or otherwise provides structure, during storage at ambient conditions, such that a stable homogenous one-phase system may be achieved in a mixture containing these three components. For purposes herein, ambient temperatures refers to room temperature (typically about 20 to about 30° C.).

For purposes of the present invention, "aroma" is the volatile portion of a substance that can be perceived by the sense of smell. In the present invention, aroma is generated from aroma-producing materials, such as flavors or aromatics, which, in a preferred embodiment, are provided on the outer surface of food products. The aroma-producing material preferably is a water-soluble aroma-producing substance that can be used neat, as a concentrate, or as dissolved or dispersed in an edible solvent. Aroma-producing materials include flavors capable of emitting aroma. In the context of this invention, a flavor solvent is a substance added to an aroma-producing flavor as a delivery system, carrier, or diluent. Preferably, the flavor solvent is selected from a group consisting of mono-, di-, or tri-hydric compounds (e.g., ethanol, propylene glycol, or glycerin), and mixtures thereof. In a preferred embodiment, ethanol or other volatile solvents are used as carriers to propel the volatile food aroma chemicals into the headspace air, thereby increasing the aroma impact of a food product when it is microwaved or otherwise rapidly heated. The aroma-producing material may comprise a minor amount (less than 50 percent and preferably less than about 40 percent) of an aroma-producing flavor and a major amount (greater than 50 percent and preferably greater than about 60 percent) of a flavor solvent.

The aroma-producing material is preferably selected to complement the food type that is treated. It may be an artificial or natural flavor. It may be a single flavor or a plurality of aroma-producing flavors. The aroma-producing flavor, for example, can be selected, for example, from cookie flavor, chocolate flavor, butter flavor, fruit flavor, nut flavor, spice flavor, herb flavor, vegetable flavor, and so forth. Unless otherwise indicated herein, reference to a "flavor" implies a type capable of emitting volatile aroma.

The medium chain fatty acid triglyceride used for the solubilizing water-soluble aroma-producing material preferably contains three saturated fatty acid groups, each independently having about 6 to about 12 carbon atoms, and preferably about 8 to about 10 carbon atoms, connected to the glycerol backbone. Typically, the medium chain fatty acid triglyceride has a melting point of about 25 to about 50° C., preferably about 30 to about 45° C. In a preferred embodiment, the medium chain fatty acid triglyceride comprises glycerol tridecanoate. Glycerol tridecanoate, also known as glycerol tricaprate (see CAS Reg. No. 621-71-6), may be structurally represented as:

Glycerol tridecanoate is particularly effective for solubilizing water-soluble aroma-producing materials. A commercial source of glycerol tridecanoate is Neobee® 1095 from Stepan Company, Maywood N.J., U.S.A., which is a solid at ambient temperature but is rendered flowable and thus more processable with moderate heating. Of course, other sources of the triglyceride can be used. For purposes of this invention, moderate heating means heating to a temperature of about 40 to about 80° C. and preferably about 55 to about 65° C.

The medium chain fatty acid glyceride component of the fat-containing combination may also act as a microwave-susceptible and heat-labile material provided within the aroma-producing composition such that rapid (typically about 5 to about 30 seconds) microwave heat treatment may be used to induce a robust aroma release from the composition at an opportune time, such as when a food product treated with the aroma-producing composition is preheated immediately before it is consumed. Rapid heating of the fatty acid triglyceride component promotes robust liberation of aroma from the one-phase aroma-producing system.

The higher melting point fat or lipid component of the fat-containing composition preferably is one or more partially or fully hydrogenated oils having about 14 to about 24 carbon atoms in the fatty acid chains. In one embodiment of this invention, "hydrogenated vegetable oils," which phrase is intended to include fully hydrogenated vegetable oils and partially hydrogenated vegetable oils which have about 30 percent or more hydrogenation, are preferred. Examples of suitable higher melting hydrogenated and partially hydrogenated vegetable oils include, but are not limited to, soybean oil, rapeseed oil, cottonseed oil, canola oil, sunflower oil, coconut oil, palm oil, and the like, as well as mixtures thereof. Examples of non-vegetable oils, include but not limited to, waxes (such as carnuba wax, bees wax, and paraffin wax) and animal fats. The higher melting point lipid component of the fat-containing composition preferably is a saturated lipid, or mixture of such lipids, containing at least one fatty acid chain having about 14 to about 24 carbon atoms. Examples of suitable higher melting lipids include trans fatty acids (having about 14 to about 24 carbon atoms) and mono-, di-, and triacyl glycerols, and the like, as well as mixtures thereof. Generally, the higher melting point fat or lipid should have a melting point at least about 20° C. higher than the medium chain fatty acid triglyceride, preferably about 30 to about 60° C. higher, and more preferably about 40 to about 50° C. higher. The higher melting point vegetable fat or lipid component of the fatty combination generally may comprise one or more of partially or fully hydrogenated vegetable oils having about 14 to about 24 carbon atoms. Preferably, the higher melting point fat or lipid, in addition to having a higher melting point than the medium chain fatty acid triglyceride, should have a melting point of about 50 to about 100° C., preferably about 60 to about 90° C., and more preferably about 70 to about 80° C.

Examples of the preferred higher melting fats and lipids include hydrogenated soybean oil, hydrogenated rapeseed oil, and hydrogenated cottonseed oil, and interesterified mixtures or other combinations thereof. Examples of such hydrogenated vegetable oils include, for example, Dritex® S, Dritex® C-41V, or Dritex® PST from ACH Food & Nutrition, Paris, Ill. These fats are solid at ambient temperature, but also are rendered flowable and thus more processable with moderate heating. Of course, edible oils from other sources or fractionated oils can be used.

The presence of the higher melting point fat or lipid increases the solids content of the one-phase system during product storage at ambient conditions and helps to stabilize and protect the aroma-producing material within the one-phase system. The level of hydrogenation of the fat or lipid component can be managed by selecting and including hydrogenated fats and/or lipids of sufficiently higher melting points than the medium chain fatty acid triglyceride to increase solids levels of the aroma-producing composition at room temperature conditions; the levels used should provide good aroma without undermining the desired one-phase system.

The sequence of combination of the aroma-producing material, medium chain fatty acid triglyceride, and higher melting point fat and/or lipid preferably involves the initial incorporation of the aroma-producing material into the melted medium chain fatty acid triglyceride with mixing, followed by addition of the melted higher melding fat and/or lipid with mixing until a substantially uniform mixture including the three components is obtained. Generally, the temperature during preparation of the aroma-producing material is about 40 to about 100° C., and more preferably about 60 to about 80° C.

In one embodiment, the aroma-producing composition preferably is applied on one or more outer exposed surfaces of a food product to maximize the aroma-producing capability of the composition and economize the usage level. The aroma-producing composition, as a homogenous one-phase system, is sprayable under moderate heat conditions sufficient to render it flowable under the given application conditions and otherwise well-suited for convenient modes of application to surfaces of food products. Generally, as the aroma-producing compositions cools on the surface of the food, it will tend to stick or adhere thereon. Generally, such moderate heat conditions for application of the composition will be in the range of about 40 to about 80° C. and preferably about 55 to about 65° C.; temperatures higher or lower than these ranges may, depending on the food product treated, actually be preferred. As the aroma-producing composition in accordance with embodiments of this invention is sprayable, or otherwise conveniently surface coated upon a substrate by brushing, roller coating, and so forth, it may be applied to food product surfaces in a highly-controlled manner.

In one aspect, the aroma-producing composition may be essentially non-flowable at temperatures of less than about 35° C., and flowable at higher temperatures, such that it can be easily manipulated and handled for coating operations and stable storage. In one aspect, the aroma-producing composition is sprayable at temperatures of about 50° C. or greater. Care should be taken to provide a temperature sufficient to render the aroma-producing composition sprayable but not so excessive that components of the composition may thermally degrade or significantly volatilize. When heated to a sufficiently flowable condition, the aroma-producing composition may be sprayed without an added diluent; of course, such diluents may be used if desired so long as they do not adversely affect the aroma-producing composition or the food product. In one embodiment, the aroma-producing composition may be sprayed as discrete wet particles under pressure to assist the application procedure. Conventional food grade sprayers may be used; one suitable food grade sprayer is sold under the tradename Dot Gun (model CE00/C-1100) by hhs Leimauftrags-Systeme GmbH, Krefeld, Germany.

An aroma-producing composition coating may be applied intermittently (e.g., as discrete deposits), continuously, or in a pattern (e.g., lines or other patterns) on a surface of the food product. The application rate of the aroma-producing composition may vary depending on the given flavor and food substrate combination, among other things. Generally at least about 0.001 g/cm2 is sufficient for the surface being coated, with about 0.002 to about 0.01 g/cm2 being preferred; higher amounts can be used if desired but are usually not necessary. For purposes of the application amount, the surface area of the particular food is estimated mathematically assuming an idealized shape with an essentially smooth surface (i.e., the nooks and crannies are not taken into account); thus, for example, the surface area of the top layer of a circular, flat cookie would simply be the area of a circle having the same diameter as the top of the cookie. Once sprayed or otherwise applied onto a food surface, the aroma-producing coating composition congeals into, and adheres or sticks to the food product as, an immobilized single phase material as it cools on the food surface. Generally it is not necessary to coat all surfaces of a given food product. For example, coating the top surface of cookies or muffins would be sufficient.

In an alternative embodiment, the aroma-producing composition may be intimately mixed with compatible foodstuffs, such as many baked goods, during their manufacture. Preferably at least a portion of aroma-producing composition ultimately resides at or near the surface of the finished foodstuff to provide the desired aroma releasing effect when heated by the consumer; the aroma-producing composition in the interior of the foodstuff, assuming it is sufficiently heated to be released within the foodstuff, will be released to the environment during consumption thereby providing a further enhanced eating experience.

The food products that can be effectively and beneficially treated by the shelf-stable, microwave energy-activated flavor coatings of the present invention are not particularly limited. The food products encompass those intended for human consumption as well as animal food products. Food products in this regard include, for example, confectioneries, bakery goods, meats, vegetables, fruits, nuts, snacks, and the like which can be heated by conventional or microwave heating. For example, the aroma producing compositions of this invention may be used to enhance or modify the aroma associated with conventional or microwave popcorn. They also can be used in ready-to-eat products that may be re-heated by microwave or other means before consumption, such as microwavable soup products, bread products, noodles, and the like. They also can be used in shelf-stable or frozen food products that may be heated using microwave energy before their consumption.

Although it is generally preferred that the aroma producing compositions of the present invention are applied to the surface or surfaces of a food product, they may also be formulated as dry powders which the consumer could sprinkle on the food product just prior to or after heating. For example, rather than having popcorn kernels with the aroma producing composition, the consumer could sprinkle on the composition on the popcorn during or after it has been popped; in this manner, the aroma is released just before eating. Using such dry powders, several different flavors/aromas could be provided and the consumer could select the one they wanted on a particular occasion. Indeed, the aroma-containing powdered material could be heated alone if desired to provide the desired aroma; for example, a freshly baked bread aroma could be produced as desired (e.g., in house selling efforts such as open houses). Such dry powered aroma-producing compositions could be prepared by conventional spray drying techniques so long as the aroma is not released during the spray drying. Such dry powdered aroma-producing compositions could also be prepared by spraying the aroma-producing composition into a liquid nitrogen bath and then evaporating the liquid nitrogen.

In one specific embodiment of the present invention, a water-soluble flavor is solubilized in melted glycerol tridecanoate to form a homogenous phase, which further can be mixed with a melted high-melting point fat or lipid and sprayed onto the food product surface (e.g., cookie) for providing temperature-triggered release of an enhanced aroma upon microwaving the food product. In one particular embodiment of the present invention, a microwavable soft cookie is provided having composition which permits aroma release after storage upon microwaving of the cookie for a short period of time. Although the soft cookies are pre-baked, they may be briefly microwaved or otherwise rapidly heated up before being consumed to bring out desirable organoleptic qualities of the food product. Rapid heating of the cookie allows a consumer to experience a nice aroma similar to a freshly baked cookie. The significance of the present invention is that a superior aroma is released upon short-term microwaving (about 5 to about 30 seconds) or other rapid heating without adversely affecting the cookie flavor during eating through use of a fat-based, temperature-triggered aroma release system.

In some cases, a white powdery appearance may arise in the aroma-producing compositions when cooled to ambient temperature. Although not wishing to be limited by theory, this appearance is thought to be due to the formation of fat crystals. If desired and mainly for aesthetics, these fat crystals may be eliminated or substantially reduced by inclusion of suitable food grade color masking substance or crystal modifying agent. Such fat crystals may also be eliminated or substantially reduced by rapid cooling of the composition (e.g., spraying the aroma-producing compositions on chilled or cold food products (generally less than about 5° C.)). Examples of suitable crystal modifying agents include polyglycerol esters (e.g., di- and tri-glycerol monoleates and dioleates); such crystal modifying agents should be present in an effective amount (i.e., an amount to eliminate or substantially reduce the formation of fat crystals; and typically at about 0.02 to about 0.2 percent).

The examples that follow are intended to illustrate, and not to limit, the invention. All percentages and ratios used in the present specification are by weight, unless otherwise indicated. All references cited herein are hereby incorporated by reference in their entireties.

EXAMPLE 1

This Example illustrates the aroma delivering composition of this invention for releasing cookie aroma from a cookie surface upon microwaving. The cookies used as the substrate upon which the aroma delivering composition was applied were Melting Moments® Warm 'n Serve Chocolate Chunk cookies (Christie Brown, a division of Nabisco, Toronto, ON).

A series of sprayable cookie aroma formulations 1, 2, 3, and 4 were prepared with the ingredients and respective amounts thereof indicated in Table 1. Each formulation contained artificial cookie flavor (i.e., doughy and buttery and two different types of fatty materials. The medium chain fatty acid triglyceride (fatty material #1 or 'FM1' for short herein) was glycerol tridecanoate fat (Neobee® 1095 from Stepan Company, Maywood, N.J.) having a melting point of about 33° C. The higher melting point fat (fatty material #2 or "FM2" for short herein) was a hydrogenated soybean oil (Dritex® S from ACH Food & Nutrition, Paris, Ill.) having a melting point of about 70° C. The amounts of the various components were varied in formulations 1-4.

In preparing the formulations, the artificial cookie flavor composition (about 25 parts in a carrier containing about 60 parts ethanol and about 15 parts propylene glycol) was added to the melted glycerol tridecanoate fat at 70° C. The melted hydrogenated soybean oil at 70° C. was then added and the mixture was blended in a vortex mixer to form a homogenous liquid mix. The liquid mixtures were sprayed onto the surface of cookies as a mist using a hand sprayer; particles of the composition adhered to the cookies as the product cooled to room temperature. The amounts applied (determined using the weight of the cookie before and after spray coating) are indicated in Table 2.

TABLE 2

Cookies with Applied Aroma Formulations

| Coating | Sample | Cookie Wt. (g) | Coating Wt. (g) |
|---|---|---|---|
| Formulation #1 | 1 | 10.8 | 0.11 |
| Formulation #1 | 2 | 10.6 | 0.13 |
| Formulation #1 | 3 | 11.1 | 0.07 |
| Formulation #1 | 4 | 10.9 | 0.08 |
| Formulation #1 | 5 | 10.5 | 0.07 |
| Formulation #2 | 6 | 10.7 | 0.19 |
| Formulation #2 | 7 | 10.4 | 0.12 |
| Formulation #2 | 8 | 10.9 | 0.09 |
| Formulation #2 | 9 | 10.6 | 0.07 |
| Formulation #2 | 10 | 10.8 | 0.03 |
| Formulation #3 | 11 | 10.8 | 0.14 |
| Formulation #3 | 12 | 10.5 | 0.20 |
| Formulation #3 | 13 | 10.4 | 0.19 |
| Formulation #3 | 14 | 10.4 | 0.16 |
| Formulation #3 | 15 | 10.8 | 0.15 |
| Formulation #4 | 16 | 10.4 | 0.12 |
| Formulation #4 | 17 | 10.9 | 0.13 |
| Formulation #4 | 18 | 10.7 | 0.11 |
| Formulation #4 | 19 | 10.8 | 0.13 |
| Formulation #4 | 20 | 10.7 | 0.14 |

The spray-coated cookies were individually wrapped in Saran® Wrap, placed in a Ziploc® bag, and stored at ambient temperature for about 90 days. The aroma release properties of the cookies were evaluated by microwaving the cookies individually for about 10 seconds in a microwave oven operated at a power setting of 1100 watts.

The microwaved cookies released a pleasing cookie aroma without adversely affecting the cookie flavor during eating. Significant aroma boosts were observed for all the different sets of cookies spray-coated with formulations 1-4. Cookies sprayed with formulation 3 had the most significant aroma release.

These results demonstrated that the fat mix both protected the flavor from degradation during storage and released the flavor as a pleasant aroma upon being rapidly heated over a broad range of formulations. These results also indicate that, within the ranges studied, the aroma release was essentially independent of the amount of coating applied. Generally, from cost savings considerations, the lowest application rate which provides the desired aroma effect would be preferred; one of ordinary skill in the art could selected such a suitable level or levels for the specific product produced.

Similar results were obtained using other higher melting vegetable fats (e.g., Dritex® C-41V from ACH Food & Nutrition; a hydrogenated cottonseed oil having a melting point of about 65° C.).

EXAMPLE 2

This Example illustrates the use of aroma delivering, chocolate-flavored composition for releasing cookie aroma from a cookie surface upon microwaving. The cookies used were the same as in Example 1.

In preparing this formulation, 3 g artificial sweet chocolate flavoring (about 19 parts chocolate flavor in a carrier of about 73 parts ethanol and about 8 parts propylene glycol) was mixed with 4.2 g melted glycerol tridecanoate fat (Neobee® 1095 at about 70° C.; melting point of about 33° C.) in a vortex mixer. Melted hydrogenated soybean oil (Dritex® S; 2.8 g at about 70° C.; melting point of about 70° C.) was then added to the solution and the resulting mixture was blended in a vortex mixer to form a homogenous liquid mix.

The resulting homogenous liquid mix (0.1 g) was sprayed on the cookies using an atomized form with the Dot Gun sprayer described in Example 1 (at pressure of about 2 bar and an overall speed setting of "Slow").

The aroma release properties of the coated cookies were evaluated after 1, 2, and 3 months storage in containers at ambient temperatures are were compared to control cookies stored under similar conditions which had not received an aroma composition coating. The cookies were individually microwaved for about 10 seconds in a microwave oven operated at a power setting of about 1100 watts.

The microwaved cookies with the aroma coating composition released a pleasing aroma of chocolate and provided a pleasing combination of chocolate and cookie flavors during consumption. The aroma provided by the inventive cookies was significantly more intense than that of the control cookies.

EXAMPLE 3

This Examples illustrates the aroma delivering compositions of this invention which further include a color masking ingredient. The color masking ingredient was used to mask the white residue that can occur.

The cookies used were the same type of cookies as in Example 1. In preparing this formulation, artificial sweet chocolate flavoring (4.5 g) and yellow-brown color (0.058 g; 09089 Brown Lake dispersion, OB, Warner Jenkinson, St. Louis, Mo.) was mixed with melted glycerol tridecanoate fat (7.5 g; Neobee® 1095 at about 70° C.) in a vortex mixer. Melted hydrogenated soybean oil (3.0 g; Dritex® S at about 70° C.) was then added to the solution and the resulting mixture was blended in a vortex mixer to form a homogenous liquid mix.

The resulting homogenous liquid mix (0.1 g) was sprayed as atomized particles on each of a plurality of the cookies using essentially the same conditions for the Dot Gun sprayer as described in Example 2. For comparison, a separate batch of the cookies was coated in a similar manner except the aroma delivery system did not include the yellow-brown color.

A white residue was noticeable on the surface of the comparison cookies. The white residue was not apparent with the cookies prepared with the aroma releasing formulation containing the yellow-brown colorant. The colorant included in the aroma releasing formulation effectively masked the presence of white-colored fatty residue on the cookies.

When microwaved for about 10 seconds in a microwave oven operated at a power setting of about 1100 watts, all cookies (i.e., both with and without the color in the aroma-producing composition) provided a pleasing aroma and flavor. The addition of the color did not impair the desired functional properties of the aroma releasing formulation.

EXAMPLE 4

This Example illustrates an aroma delivering composition of this invention which releases freshly roasted peanut aroma upon heating in a microwave oven.

A polyglycerol polyricinoleate emulsifier (1.5 g; Admul 1408K; Quest International, Hoffman Estates, Ill.) was mixed with a glycerol tridecanoate fat (20 g; Neobee 1095; Stepan Company, Maywood N.J.) and a hydrogenated vegetable oil (10 g; Wecobee S; Stepan Company, Maywood N.J.) and then melted in a microwave oven. Peanut flavor (1.5 g) was added to the melted mixture and the resultant mixture was homogenized to provide the peanut aroma composition. The melted peanut aroma composition (0.38 g) was sprayed on partially roasted peanuts (84 g) which lacked the desired fully roasted aroma and flavor typically associated with fully roasted peanuts. The peanuts were placed in a paper bag suitable for use in a microwave oven and sealed. The sealed peanuts were heated in a microwave oven for 20 seconds. A pleasant, fully roasted peanut aroma was released during microwaving; an even stronger aroma was noted when the bag was opened. The aroma also enhanced the flavor of the partially roasted peanuts. A control sample, without the aroma composition, was treated in the same manner. Since the starting peanuts were only partially roasted, the aroma released from the control sample was inferior to the peanuts containing the inventive aroma composition with regard to the desired fully roasted aroma and flavor notes.

Although the present invention is exemplified in the examples by reference to cookies exposed to a short duration of microwave heating before consumption, it will be appreciated that the concept is widely applicable to other food products that may be microwaved before consumption for purposes of sensory enhancement and/or cooking purposes.

While the invention has been particularly described with specific reference to particular process and product embodiments, it will also be appreciated that various alterations, modifications and adaptions may be based on the present disclosure, and are intended to be within the spirit and scope of the present invention as defined by the following claims.

What is claimed is:

1. An aroma-producing composition for controlled release of a desired aroma, said composition comprising:
   an aroma-producing material to provide the desired aroma, the aroma-producing material including an aroma-producing substance and a solvent selected from the group consisting of mono-hydric compounds, di-hydric compounds, tri-hydric compounds and mixtures thereof;
   a fat-containing composition including a medium chain fatty acid triglyceride that solubilizes the aroma-producing substance and solvent of the aroma-producing material, and a fat or lipid having a higher melting point than the medium chain fatty acid triglyceride; and
   wherein the aroma-producing composition is a homogenous one-phase system in which the desired aroma is released in a controlled manner upon moderate heating.

2. The aroma-producing composition of claim 1, wherein the aroma-producing substance is water-soluble.

3. The aroma-producing composition of claim 1, wherein the solvent is selected from the group consisting of ethanol, propylene glycol, glycerin and mixtures thereof.

4. The aroma-producing composition of claim 1, wherein the medium chain fatty acid glyceride has three saturated fatty acid groups, each fatty acid group independently having about 6 to about 12 carbon atoms, connected to a glycerol backbone.

5. The aroma-producing composition of claim 4, wherein the medium chain fatty acid glyceride is glycerol tridecanoate.

6. The aroma-producing composition of claim 1, wherein the fat or lipid contains at least one fatty acid chain having about 14 to about 24 carbon atoms and wherein the melting point of the fat or lipid is at least about 20° C. higher than the medium chain fatty acid triglyceride.

7. The aroma-producing composition of claim 6, wherein the fat or lipid is selected from the group consisting of hydrogenated soybean oil, hydrogenated rapeseed oil, hydrogenated cottonseed oil, and mixtures thereof.

8. The aroma-producing composition of claim 1, wherein the aroma-producing composition is flowable at temperatures greater than about 35°.

9. An aroma-producing composition for controlled release of a desired aroma, said aroma-producing composition comprising:
   about 5 to about 40 percent of an aroma-producing material, the aroma-producing material including a water soluble aroma-producing substance and a solvent selected from the group consisting of mono-hydric compounds, di-hydric compounds, tri-hydric compounds and mixtures thereof;
   about 60 to about 95 percent of a fat-containing composition including about 35 to about 75 percent of a medium chain fatty acid triglyceride that can solubilize the aroma-producing substance and solvent of the aroma-producing material, and about 25 to about 65 percent of a fat or lipid having a higher melting point than the medium chain fatty acid triglyceride; and
   wherein the aroma-producing composition is a homogenous one-phase system in which the desired aroma is released in a controlled manner upon moderate heating.

10. The aroma-producing composition of claim 9, wherein the medium chain fatty acid glyceride has three saturated fatty acid groups, each fatty acid group independently having about 6 to about 12 carbon atoms, connected to a glycerol backbone.

11. The aroma-producing composition of claim 10, wherein the medium chain fatty acid glyceride is glycerol tridecanoate.

12. The aroma-producing composition of claim 10, wherein the fat or lipid contains at least one fatty acid chain containing about 14 to about 24 carbon atoms and wherein the melting point of the fat or lipid is at least about 20° C. higher than the medium chain fatty acid triglyceride.

13. The aroma-producing composition of claim 12, wherein the fat or lipid is selected from the group consisting of hydrogenated soybean oil, hydrogenated rapeseed oil, hydrogenated cottonseed oil, and mixtures thereof.

14. The aroma-producing composition of claim 12, wherein the aroma-producing composition is flowable at temperatures greater than about 35° C.

15. The aroma-producing composition of claim 9, wherein the aroma-producing material includes less than about 50 percent water-soluble aroma-producing substance and at about 50 percent or greater of the solvent.

16. A food product allowing for controlled release of a desired aroma, said food product comprising an aroma-producing composition applied to the food product wherein the aroma-producing composition comprises:
   an aroma-producing material to provide the desired aroma, the aroma-producing material including an aroma-producing substance and a solvent selected from the group consisting of mono-hydric compounds, di-hydric compounds, tri-hydric compounds and mixtures thereof;
   a fat-containing composition including a medium chain fatty acid triglyceride that solubilizes the aroma-producing substance and solvent of the aroma-producing material, and a fat or lipid having a higher melting point than the medium chain fatty acid triglyceride; and
   wherein the aroma-producing composition is a homogenous one-phase system in which the desired aroma is released in a controlled manner upon moderate heating of the food product and wherein the aroma producing composition is sprayable from about 40 to about 80° C.

17. The food product of claim 16, wherein the aroma-producing composition is applied onto at least one surface of the food product.

18. The food product of claim 17, wherein the aroma-producing composition is applied onto the surface of the food product at about 0.001 to about 0.03 g/cm².

19. The food product of claim 7, wherein the medium chain fatty acid glyceride has three saturated fatty acid groups, each fatty acid group independently having about 6 to about 12 carbon atoms, connected to a glycerol backbone; and wherein the fat or lipid contains at least one fatty acid chain having about 14 to about 24 carbon atoms and wherein the melting point of the fat or lipid is at least about 20° C. higher than the medium chain fatty acid triglyceride.

20. The food product of claim 19, wherein the medium chain fatty acid glyceride is glycerol tridecanoate; and wherein the fat or lipid is selected from the group consisting of hydrogenated soybean oil, hydrogenated rapeseed oil, hydrogenated cottonseed oil, and mixtures thereof.

21. The food product of claim 19, wherein the food product is a baked good.

22. The food product of claim 19, wherein the food product is a cookie.

23. The aroma-producing composition of claim 1, wherein the aroma-producing composition includes about 5 to about 40 percent of the aroma-producing material, and about 60 to about 95 percent of the fat-containing composition including about 35 to about 75 percent of the medium chain fatty acid triglyceride that can solubilize the aroma-producing substance and solvent of the aroma-producing material and about 25 to about 65 percent of the fat or lipid having a higher melting point than the medium chain fatty acid triglyceride.

24. The aroma-producing composition of claim 1, wherein the aroma producing material includes less than about 50 percent of the aroma-producing substance and about 50 percent or greater of the solvent.

25. The aroma-producing composition of claim 1, wherein the aroma-producing composition is flowable at temperatures of about 40 to about 80° C. such that it can be sprayed and the aroma-producing composition is essentially non-flowable at temperatures below about 35° C.

26. The food product of claim 16, wherein the aroma producing substance is a water-soluble aroma-producing substance.

* * * * *

UNITED STATES PATENT AND TRADEMARK OFFICE
CERTIFICATE OF CORRECTION

| | | |
|---|---|---|
| PATENT NO. | : 7,972,646 B2 | |
| APPLICATION NO. | : 12/212075 | |
| DATED | : July 5, 2011 | |
| INVENTOR(S) | : Anilkumar Ganapati Gaonkar et al. | |

It is certified that error appears in the above-identified patent and that said Letters Patent is hereby corrected as shown below:

Column 14, line 13, delete "claim 12" and insert --claim 9-- therefor.

Signed and Sealed this
Twentieth Day of March, 2012

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,972,646 B2 |
| APPLICATION NO. | : 12/212075 |
| DATED | : July 5, 2011 |
| INVENTOR(S) | : Anilkumar Ganapati Gaonkar et al. |

It is certified that error appears in the above-identified patent and that said Letters Patent is hereby corrected as shown below:

Column 14, line 45, delete "claim 7" and insert --claim 17-- therefor.

Signed and Sealed this
Twenty-ninth Day of May, 2012

David J. Kappos
*Director of the United States Patent and Trademark Office*